United States Patent
Chubb et al.

[15] 3,661,709
[45] May 9, 1972

[54] NONSWELLING URANIUM NITRIDE FUEL

[72] Inventors: Walston Chubb, Worthington; Donald L. Keller, Columbus; Richard A. Wullaert, Columbus; Victor Storhok, Columbus, all of Ohio

[73] Assignee: The United States of America as represented by the United States Atomic Energy Commission

[22] Filed: Apr. 6, 1970

[21] Appl. No.: 26,064

[52] U.S. Cl..................................176/67, 176/69, 176/70, 176/91 SP, 252/301.1 R, 264/.5 R, 23/347
[51] Int. Cl..........................................G21c 3/20
[58] Field of Search..................176/67, 68, 69, 70, 89, 73, 176/91, 91 SP; 264/.5 R; 252/301.1 R; 23/346, 347, 344; 75/205

[56] References Cited

UNITED STATES PATENTS

| 3,291,697 | 12/1966 | Chernock...................................176/69 |
|---|---|---|
| 3,262,859 | 7/1966 | Winsche....................................176/73 |
| 3,376,201 | 4/1968 | Bain..........................................176/67 |
| 3,472,734 | 10/1969 | Boettcher..............................176/67 X |
| 3,442,762 | 5/1969 | Denton......................................176/69 |
| 3,413,195 | 11/1968 | Boettcher..............................176/67 X |
| 3,294,645 | 12/1966 | Susskind et al...........................176/45 |
| 3,287,910 | 11/1966 | Silverstein............................176/45 X |
| 3,244,597 | 4/1966 | Tower....................................176/45 X |

*Primary Examiner*—Carl D. Quarforth
*Assistant Examiner*—Gary G. Solyst
*Attorney*—Roland A. Anderson

[57] ABSTRACT

A high-temperature dimensionally stable nuclear reactor fuel element containing tungsten and uranium nitride in the form of a cermet or uranium nitride only in which the particle size of the fuel material is not larger than the grain size of the uranium nitride and in which the fuel region contains 20 to 30 volume percent of highly interconnected porosity evenly distributed throughout the fuel region.

4 Claims, No Drawings

3,661,709

NONSWELLING URANIUM NITRIDE FUEL

CONTRACTUAL ORIGIN OF THE INVENTION

The invention described herein was made in the course of, or under, a contract with the United States Atomic Energy Commission.

BACKGROUND OF THE INVENTION

This invention relates to a nuclear reactor fuel element. More specifically, this invention relates to a dimensionally stable reactor fuel element. In still more detail, the invention relates to a nonswelling fuel element containing uranium nitride or tungsten and uranium nitride in the form of a cermet.

One of the major problems of the atomic energy industry is the development of a fuel which can withstand the high temperatures projected for fast breeder reactors of the future. It is not possible to get the desired performance from known fuels due to dimensional instability of these fuels. Evidence is readily available which shows that at relatively low temperatures, nuclear fuels grow at a rate of about 0.5 volume percent per $10^{20}$ fissions per $cm^3$. This growth is attributed to the appearance of two fission products in the lattice of the solid fuel for each fission event. At somewhat higher temperatures — about 1,100° C. for uranium nitride — nuclear fuels begin to swell more than the above amounts. This swelling is attributed to the precipitation of the fission product gases as tiny bubbles in the fuel. These bubbles are initially formed at high pressures and they swell as a function of the temperature and the strength of the fuel. At still higher temperatures, gas mobility increases sufficiently that, after a large amount of swelling has occurred, gas generation is balanced by gas release and swelling slows or ceases. Various approaches have been tried in an attempt to find a solution to the problem, including providing a plenum chamber for fission gases at one or both ends of the fuel assembly, providing porosity in the fuel, employing cladding which is strong enough to withstand the swelling, venting gases to the exterior of the assembly or changing the fuel material so that swelling does not occur. None of these solutions have been completely satisfactory.

It is therefore the object of this invention to develop a nuclear reactor fuel element which is essentially dimensionally stable at high temperatures.

SUMMARY OF THE INVENTION

This and other objects are attained in a nuclear reactor fuel element containing uranium nitride or tungsten and uranium nitride in the form of a cermet in which the particle size of the fuel material is no larger than the grain size of the uranium nitride and the void area within the element is largely interconnected and equal to from 20 to 30 volume percent.

DETAILED DESCRIPTION OF THE INVENTION

While the fuel element to be described could obviously be used for any reactor employing a liquid coolant and would be expected to give improved results under a wide variety of conditions, it is designed for use in nuclear reactors where the major portion of the fuel is at a temperature of between 1,400° and 1,800° C., and preferably no higher than 1,650° C.

The fuel element of the present invention consists of an outer container or cladding which contains a fuel material of uranium nitride or of a uranium nitride and tungsten cermet wherein the uranium nitride is of a particle size no larger than the grain size of the uranium nitride and where the fuel material contains 20 to 30 volume percent evenly distributed and highly interconnected porosity or void area, or, stated otherwise, where the fuel material is 70 to 80 percent of theoretical density. It is important that the particle size of the fuel material be no larger than the grain size of uranium nitride except that the maximum particle size should be no larger than about 300 microns in diameter.

The element must contain 20 to 30 volume percent void area, and it is important that this void area be highly interconnected and evenly distributed throughout the fuel rather than being present as a centerline hole through the longitudinal axis of the fuel or as an annular space separating the fuel from the cladding material. It is also important that this void area or porosity be no less than 20 volume percent and no more than 30 volume percent of the total volume of the element. A porosity of less than 20 volume percent may result in radial or circumferential swelling of the fuel element which is of an undesirable and potentially intolerable amount, that is, greater than about 1 percent per $10^{20}$ fissions per $cm^3$, which could result in structural failure of the cladding. On the other hand, a porosity of greater than 30 volume percent could result in insufficient fuel in the reactor, rendering the reactor inoperable due to an inability to sustain fission.

The cladding may be of any suitable material known to those skilled in the art — for example, tungsten — 26 w/o rhenium — and represents no part of the invention.

The fuel element may be made by any suitable method which will result in the required fuel particle size and porosity content and distribution. For example, tubes of cladding may be filled with uranium nitride particles of the appropriate size and then compacted by vibration in an appropriate device until the desired fuel density has been attained. The rods may then be sealed, whereupon they are ready for use in a reactor.

It has been found that fission gases tend to collect and form relatively large bubbles at the boundaries between grains of dense uranium nitride, where the gases eventually force the grains apart, rapidly increasing the fuel volume and eventually causing an inordinate dimensional change in the cladding. Fission gases also collect and form relatively small bubbles within the grains of uranium nitride, causing them to swell; however, if porosity is provided as a layer between grains or particles, then this small amount of swelling is dissipated harmlessly into the void areas built into the fuel material, where little or no dimensional change can result. By limiting the uranium nitride particles to a size no larger than the grain size of uranium nitride and by controlling the amount of porosity and distributing it evenly throughout the fuel, so that ideally each fuel particle is entirely surrounded with void space, the number of mechanical contacts between grains or particles of fuel material are kept to a minimum and interconnected channels are provided so that the fission gases as they are formed escape directly into a remote void volume or plenum rather than collecting at grain boundaries where the gases can cause dimensional instability. In addition, since it is inevitable that some grain boundaries are going to exist and that fission gases will collect at these boundaries and that these gases which collect will cause grain separation, the void space which is present in the fuel region can absorb this separation, preventing the grains from contacting other grains which would result in further grain boundaries at which the fission gases could collect and cause additional fuel swelling.

A capsule containing five specimens, two of uranium nitride containing 30 percent porosity, two of 25 percent tungsten — 61 percent uranium nitride containing 14 percent porosity and one of 25 percent tungsten — 51 percent uranium nitride containing 24 percent porosity, was irradiated for 3,000 hours at temperature up to 1,780° C. and burnups up to about 2.0 × $10^{20}$ fissions per $cm^3$. All of the specimens were clad with tungsten — 26 percent rhenium 20 mils thick. One of the 25 percent tungsten — 61 percent uranium nitride specimens contained a 55-mil centerline hole.

The following table summarizes the specimen arrangement, irradiation conditions and dimensional changes for the uranium nitride and tungsten — uranium nitride cermet specimens.

3,661,709

TABLE 1

| Spec. (in order from top of capsule) | Composition | Spec. variable | BRR cycle | Surface temp.,(a)° C. | Estimated accumulated burnup, 10²⁰ fissions/cm.³ | Dimension changes, b percent | | | |
|---|---|---|---|---|---|---|---|---|---|
| | | | | | | Maximum cladding OD | Ave. fuel OD | Fuel length | Ave. fuel vol. |
| 322 | UN | 70% dense | 1 | 1,595/1,730 | 0.16 | 1.4 | 1.0 | 0.1 | 2.1 |
| | | | 2 | 1,650 | 0.43 | −0.4 | −0.9 | 0.0 | −1.8 |
| | | | 3 | 1,670 | 0.67 | 1.8 | 0.6 | 0.4 | 1.6 |
| | | | 4 | 1,670 | 0.93 | 0.8 | −0.3 | −0.1 | −0.7 |
| | | | 5 | 1,680 | 1.20 | −1.0 | −1.5 | 0.5 | −2.5 |
| | | | 6 | 1,660 | 1.46 | 0.5 | 0.0 | 0.7 | 0.7 |
| | | | 7 | 1,660 | 1.72 | 0.9 | 0.5 | 1.0 | 2.0 |
| | | | | | | [2.2] | [2.0] | | [5.0] |
| 324 | 25 v/o W-61 v/o UN-14 v/o porosity. | | 1 | 1,700/1,805 | 0.17 | −0.3 | −0.7 | 0.3 | −1.1 |
| | | | 2 | 1,700 | 0.45 | 0.0 | −0.2 | 0.8 | 0.4 |
| | | | 3 | 1,785 | 0.70 | 0.5 | 0.3 | 0.4 | 1.0 |
| | | | 4 | 1,785 | 0.98 | c4.8 | 3.1 | 1.4 | 7.6 |
| | | | 5 | 1,790 | 1.26 | 3.6 | 3.4 | 1.5 | 8.3 |
| | | | 6 | 1,780 | 1.54 | 7.4 | 4.6 | 1.1 | 10.3 |
| | | | 7 | 1,780 | 1.81 | 5.4 | 4.1 | 2.5 | 10.7 |
| | | | | | | [8.0] | [6.2] | | [14.9] |
| 325 | 25 v/o W-61 v/o UN-14 v/o porosity. | 55-mil centerline hole. | 1 | 1,680/1,769 | 0.17 | 0.8 | 0.4 | −0.5 | 0.3 |
| | | | 2 | 1,725 | 0.44 | 0.7 | 0.7 | 0.1 | 1.5 |
| | | | 3 | 1,750 | 0.69 | 1.1 | 1.2 | 0.6 | 3.0 |
| | | | 4 | 1,725 | 0.96 | 2.0 | 1.2 | 0.1 | 2.5 |
| | | | 5 | 1,735 | 1.23 | 1.2 | 0.9 | 0.1 | 1.9 |
| | | | 6 | 1,730 | 1.51 | 3.1 | 2.6 | −0.3 | 4.9 |
| | | | 7 | 1,730 | 1.77 | 4.4 | 4.4 | 1.9 | 10.8 |
| | | | | | | [5.2] | [4.9] | | [11.7] |
| 328 | 25 v/o W-51 v/o UN-24 v/o porosity. | | 1 | 1,710/1,820 | 0.17 | −0.4 | −0.8 | 0.1 | −1.5 |
| | | | 2 | 1,750 | 0.46 | 0.5 | 0.3 | 0.6 | 1.2 |
| | | | 3 | 1,770 | 0.72 | 0.3 | 0.2 | −0.5 | −0.1 |
| | | | 4 | 1,765 | 1.00 | 0.4 | 0.1 | −0.8 | −0.6 |
| | | | 5 | 1,760 | 1.27 | 0.1 | −0.3 | −0.9 | −1.5 |
| | | | 6 | 1,760 | 1.56 | 0.1 | 0.0 | −1.4 | −1.4 |
| | | | 7 | 1,760 | 1.83 | 1.2 | 1.0 | −2.1 | −0.1 |
| | | | | | | [1.3] | [1.5] | | [0.9] |
| 323 | UN | 70% dense | 1 | 1,645/1,710 | 0.16 | 1.4 | −0.4 | −0.7 | −1.5 |
| | | | 2 | 1,625 | 0.42 | 0.0 | −0.2 | −0.1 | −0.4 |
| | | | 3 | 1,685 | 0.66 | −0.4 | −0.8 | −0.1 | −1.7 |
| | | | 4 | 1,680 | 0.92 | 1.4 | 1.3 | −0.9 | 1.7 |
| | | | 5 | 1,650 | 1.18 | 2.0 | 1.0 | −0.2 | 1.8 |
| | | | 6 | 1,635 | 1.44 | 3.7 | 2.4 | −1.8 | 30 |
| | | | 7 | 1,640 | 1.69 | 3.4 | 2.3 | −1.2 | 3.4 |
| | | | | | | [4.9] | [4.2] | | [7.2] | a The temperature was measured at the midpoint of the length of the fuel and averaged over each cycle. The second number in this column is the maximum temperature reached during Cycle 1.
b Values in brackets are based on micrometer measurements of diameter; all other measurements were taken from neutron radiographs.
c Dimensional changes were taken from the 90-degree view since a measurement of the diameter including the split would not be representative of the sample.

It is at once apparent form the table that the average fuel volume or swelling of the specimens which contained 24 and 30 percent porosity increased from one-half to one-third less than those specimens which contained only 14 percent porosity, thus emphasizing the necessity for maintaining a minimum of 20 volume percent porosity in the fuel element subassembly.

Table II below lists a number of specimens containing porosity of less than 20 volume percent which were contained in various other capsules irradiated in the same manner as capsule 7 in Table I.

TABLE II

| Spec. | HT-BRR capsule | Specimen composition | U²³⁵ enrichment, percent | Irradiation cycle | Maximum surface temp., ° C. | Accumulated burnup, 10²⁰ fissions per cm.³ | Dimensional changes, percent | | | |
|---|---|---|---|---|---|---|---|---|---|---|
| | | | | | | | Maximum cladding OD a | Ave. fuel OD | Fuel length | Ave. fuel vol. b |
| 287 | 3 | W-75 v/o UN (98% dense) | 14.0 | 1 | 1,695 | 0.35 | 2.7 | 3.4 | 1.3 | 8.1 |
| | | | | 2 | 1,695/1,785 | 0.67 | 9.3 | 9.2 | 2.4 | 20.8 |
| | | | | 3 | 1,750 | 1.02 | 6.3 | 7.4 | 2.6 | 17.4 |
| | | | | 4 | 1,725 | 1.38 | 8.7 | 9.0 | 2.5 | 20.5 |
| | | | | 5 | 1,615/1,735 | 1.63 | 8.9 | 8.6 | 1.1 | 18.3 |
| | | | | 6 | 1,740 | 1.98 | 9.9 | 11.0 | 0.7 | 22.7 |
| | | | | 7 | 1,755 | 2.07 | 9.0 | 10.4 | 1.1 | 21.9 |
| | | | | 8 | 1,750 | 2.50 | 9.0 | 10.3 | 0.9 | 21.5 |
| | | | | 9 | 1,750 | 2.67 | 8.5 | 6.4 | −0.4 | 14.4 |
| | | | | | | | [7.9] | | | [16.7] |
| 288 | 3 | UN (97% dense) | 8.5 | 1 | 1,620 | 0.33 | 4.3 | 3.7 | 1.7 | 9.1 |
| | | | | 2 | 1,620/1,715 | 0.64 | 10.6 | 11.2 | 2.8 | 25.2 |
| | | | | 3 | 1,670 | 0.98 | 10.2 | 9.2 | 2.3 | 20.7 |
| | | | | 4 | 1,640 | 1.32 | 10.7 | 10.1 | 2.7 | 22.9 |
| | | | | 5 | 1,570/1,660 | 1.56 | 10.1 | 8.0 | 2.9 | 18.9 |
| | | | | 6 | 1,655 | 1.81 | 9.8 | 11.0 | 2.9 | 24.9 |
| | | | | 7 | 1,675 | 1.96 | 10.3 | 9.4 | 2.9 | 21.7 |
| | | | | 8 | 1,680 | 2.36 | 11.5 | 11.7 | 3.3 | 26.7 |
| | | | | 9 | 1,680 | 2.51 | 10.5 | 10.1 | 3.6 | 23.8 |
| | | | | | | | [9.7] | | | [23.8] |
| 293 | 4 | UN (8.5% enriched; 97% dense) (55-mil dia. centerline hole). | | 1 | 1,515/1,650 | 0.17 | 2.5 | 2.0 | 0 | 4.0 |
| | | | | 2 | 1,635 | 0.42 | 0.8 | 1.0 | 0.6 | 2.6 |
| | | | | 3 | 1,615 | 0.56 | 4.3 | 3.4 | 0.4 | 7.2 |
| | | | | 4 | 1,660 | 0.97 | 6.3 | 5.3 | 0.1 | 10.7 |
| | | | | 5 | 1,600 | 1.14 | 4.3 | 3.7 | 1.5 | 8.9 |
| | | | | 6 | 1,615 | 1.42 | 6.9 | 5.9 | 2.8 | 14.6 |
| | | | | 7 | 1,615 | 1.72 | 6.1 | 6.2 | 2.7 | 15.1 |
| | | | | 8 | 1,600 | 2.12 | 6.5 | 6.5 | 4.3 | 17.3 |
| | | | | | | | [7.0] | [6.3] | | [16.9] |
| 330 | 8 | UN: 85% dense; −325 mesh particles | | 1 | 1,780/1,820 | 0.31 | 2.0 | 2.0 | | 4.0 |
| | | | | 2 | 1,785/1,815 | 0.65 | 2.7 | 3.1 | | 6.2 |
| | | | | 3 | 1,800/1,820 | 1.00 | 4.3 | 3.2 | | 6.4 |
| | | | | 4 | 1,765/1,790 | 1.34 | 6.1 | 6.0 | | 12.0 |

Table II – Continued

| Spec. | HT-BRR capsule | Specimen composition | $U^{235}$ enrichment, percent | Irradiation cycle | Maximum surface temp., °C | Accumulated burnup, $10^{20}$ fissions per cm.³ | Dimensional changes, percent | | | |
|---|---|---|---|---|---|---|---|---|---|---|
| | | | | | | | Maximum cladding OD [a] | Ave. fuel OD | Fuel length | Ave. fuel vol. [b] |
| | | | | 5 | ~1,750/1,780 | 1.68 | 5.6 | 6.5 | ---------- | 13.0 |
| | | | | 6 | ~1,750 | 2.02 | 12.1 | 11.5 | ---------- | 23.0 |
| | | | | | | | [11.5] | [11.7] | ---------- | [23.4] |
| 331 | 8 | UN: 85% dense; −100+200 mesh particles. | ---------- | 1 | 1,790/1,830 | 0.33 | 0.9 | 0.6 | 0.9 | 2.1 |
| | | | | 2 | 1,805/1,820 | 0.69 | 2.2 | 2.5 | 0.0 | 5.0 |
| | | | | 3 | 1,810/1,835 | 1.05 | 1.6 | 1.6 | 0.8 | 4.0 |
| | | | | 4 | 1,775/1,805 | 1.41 | 5.0 | 5.0 | 0.8 | 10.8 |
| | | | | 5 | 1,770/1,790 | 1.77 | 5.3 | 5.2 | 1.0 | 11.2 |
| | | | | 6 | ~1,770 | 2.12 | 7.0 | 8.3 | 1.6 | 18.2 |
| | | | | | | | [8.7] | [8.3] | ---------- | [18.2] |
| 337 | 8 | UN: 92% dense; 6-mil gap; −100+200 mesh particles. | ---------- | 1 | 1,630/1,675 | 0.30 | 0.0 | −0.3 | −1.1 | −1.7 |
| | | | | 2 | 1,630/1,675 | 0.63 | 0.4 | 0.2 | −0.3 | 0.1 |
| | | | | 3 | 1,625/1,685 | 0.95 | 1.1 | 0.4 | −1.6 | −0.8 |
| | | | | 4 | 1,580/1,670 | 1.29 | 3.5 | 3.5 | −0.8 | 6.2 |
| | | | | 5 | 1,500/1,550 | 1.62 | 9.7 | 8.8 | 1.2 | 18.8 |
| | | | | 6 | ~1,500 | 1.96 | 17.3 | 15.0 | 2.2 | 32.2 |
| | | | | | | | [21.4] | [15.6] | ---------- | [33.4] |

[a] Micrometer measurements of cladding change are in brackets.
[b] Fuel volume change = 2 (percent fuel diameter change) plus (percent fuel length change). Values in brackets are based on micrometer measurements of diameter. All other values are based on measurements from neutron radiographs.

It can be seen from Table II that specimens having the same composition and irradiated in the same manner as the specimens shown in Table I, except for containing less porosity, have shown substantially greater volume changes than the specimens containing the increased porosity.

A metallographic cross section taken of uranium nitride specimen 322 after irradiation was completed showed that the porosity remained well distributed throughout the fuel. A photograph of the microstructure of the specimen disclosed that very small bubbles of fission gases have formed and remain within the grains of uranium nitride. Fission gases have also collected as chains of bubbles at the boundaries between grains of uranium nitride fuel. It is apparent that most of the swelling due to fission gases has been eliminated because of the ability of the gases to escape to the porosity built into the fuel. It is also apparent that the separation of the fuel grains from one another due to the collection of fission gases at the grain boundaries has been absorbed by the porosity in the fuel rather than by an increase in total fuel volume caused by dimensional instability of the fuel cladding.

It is readily apparent from the above description that a uranium nitride or tungsten — uranium nitride cermet fuel subassembly containing a sufficient amount of controlled void area and made up of appropriately sized fuel particles separated from one another by interconnected porosity provides a substantial improvement over fuel subassemblies not containing these limitations upon their specifications.

It will be understood that the invention is not to be limited to the details given herein but that it may be modified within the scope of the appended claims.

The embodiments of the invention in which an exclusive property or privilege is claimed are defined as follows:

1. A high-temperature nuclear reactor fuel element containing fuel selected from materials of the group consisting of particles of uranium nitride and particles of a cermet of uranium nitride together with tungsten wherein the particle size of the fuel material is up to $300\mu$ in diameter of the fuel material and the element contains 20 to 30 volume percent void area wherein the fuel particles are surrounded by void space whereby the contacts between particles of the fuel are kept to a minimum.

2. The reactor fuel of claim 1 wherein the void spaces of the void area are evenly distributed and interconnected throughout the fuel material.

3. The reactor fuel of claim 2 wherein the fuel is a cermet of uranium nitride and tungsten.

4. The reactor fuel of claim 2 wherein the fuel consists of particles of uranium nitride.

* * * * *